(12) United States Patent
Weichmann et al.

(10) Patent No.: US 6,555,683 B1
(45) Date of Patent: Apr. 29, 2003

(54) CONDENSATION PRODUCTS BASED ON AMINO-S-TRIAZINES AND THE USE THEREOF

(75) Inventors: Josef Weichmann, Pleiskirchen (DE); Aloisia Stadler, Tacherting (DE); Alfred Kern, Kirchweidach (DE)

(73) Assignee: SKW Polymers GmbH, Trostberg (DE)

( * ) Notice: Subject to any disclaimer, the term of this patent is extended or adjusted under 35 U.S.C. 154(b) by 0 days.

(21) Appl. No.: 08/930,839

(22) PCT Filed: Mar. 29, 1996

(86) PCT No.: PCT/EP96/01403

§ 371 (c)(1),
(2), (4) Date: Sep. 29, 1997

(87) PCT Pub. No.: WO96/30423

PCT Pub. Date: Oct. 3, 1996

(30) Foreign Application Priority Data

Mar. 31, 1996 (DE) .......................... 195 11 925

(51) Int. Cl.$^7$ ............................................. C07D 251/64
(52) U.S. Cl. ..................... 544/194; 544/196; 544/204; 544/205
(58) Field of Search ................................. 544/200, 205, 544/194, 196, 204

(56) References Cited

U.S. PATENT DOCUMENTS

| | | | | | |
|---|---|---|---|---|---|
| 2,407,599 A | * | 9/1946 | Auten et al. | ................. | 544/200 |
| 2,412,855 A | * | 12/1946 | Auten et al. | ................. | 544/200 |
| 2,730,516 A | * | 1/1956 | Suen et al. | ................. | 544/200 |
| 5,750,634 A | * | 5/1998 | Albrecht et al. | ............. | 528/254 |
| 5,789,526 A | * | 8/1998 | Weichmann et al. | ........ | 528/254 |

\* cited by examiner

*Primary Examiner*—John M. Ford
(74) *Attorney, Agent, or Firm*—Fulbright & Jaworski L.L.P.

(57) ABSTRACT

In the proposed condensation product based on amino-s-triazines with at least two amino groups, formaldehyde and sulphite, the molar ratio of amino-s-triazine, formaldehyde and sulphite is 1:2.5–6.0:1.51–2.0 and the formiate content is less than 0.3 wt %. The condensation product is obtained by a) heating amino-s-triazine, formaldehyde and a sulphite in the molar ratio 1:2.5–6.0:1.51–2.0 in an aqueous solution at a temperature of 60–90° C. and a pH level of between 9.0 and 13.0 until the sulphite can no longer be detected; b) continuing the condensation at a pH level of between 3.0 and 6.5 and a temperature of 60–80° C. until the condensation product has a viscosity of 5–50 mm/s at 80° C.; and c) adjusting the pH level of the condensation product to 7.5–12.0 or carrying out thermal secondary treatment at a pH level of >10.0 and a temperature of 60–100° C. The product can be used as an additive for inorganic binders such as cement.

19 Claims, No Drawings

CONDENSATION PRODUCTS BASED ON AMINO-S-TRIAZINES AND THE USE THEREOF

The present invention is concerned with condensation products based on amino-s-triazines with at least two amino groups and formaldehyde with a relatively high content of sulphonic acid groups and a small content of formate, as well as with the use thereof as additives for inorganic binding agents, especially cement.

It is known that the flowability of building materials based oninorganic binding agents, such as cement, gypsum and anhydrite, can be increased by means of dispersing agents. By means of the improved flowability, a lower water/binding agent ratio can be maintained, whereby higher strengths of the hardened building material result. Reaction products based on melamine, formaldehyde and alkali metal sulphites have, in particular, hereby achieved technical importance.

Thus, in DE-AS 23 59 291, there are described condensation products of melamine, formaldehyde and an alkali metal sulphite in a mol ratio of 1:2.8 to 2.3:0.9 to 1.1. According to conventional ideas, such as are described, for example, in EP-A 0 059 353, melamine and alkali metal sulphite hereby react equimolar with neutralisation of one of the three amino groups of the melamine to give sulphonated methylol compounds which are subsequently further condensed by reaction of the two remaining amino groups of the melamine to give linear polycondensates.

For the achievement of suitable molecular weight distributions, such as are necessary for the dispersing action aimed for, the maintenance of a substantially equimolar mol ratio of melamine and alkali metal sulphite is, therefore, of importance such as is required in the above-mentioned DE-AS 23 59 291 by the ratio of melamine to sulphite of 1:0.9 to 1.1.

This range is only slightly widened according to Japanese Laid-Open Publication 57/100 959 in which molar ratios of melamine:formaldehyde:sulphite of 1.0:2.7 to 3.3:0.9 to 1.2 are disclosed. Since the alkali metal sulphites represent by far the cheapest starting material for the production of sulphonic acid groups-containing melamine-formaldehyde resins, products were also later described in which the ideal 1:1 mol ratio of melamine:sulphite was gone beyond.

Thus, for example, in South African Patent 78/2022, condensation products are described based on melamine, formaldehyde and an alkali metal sulphite with the mol ratio of 1:2.5 to 4.0:0.2 to 1.5. According to EP-A 0 336 165, there is also gone up to the limiting mol ratio of melamine:sulphite of 1:1.5 which also describes sulphonic acid groups-containing condensation products based on amino-s-triazines with at least two amino groups and formaldehyde. It is common to all of these publications that, according to their disclosure, the mol ratio of melamine: sulphite of 1:1.5 is not exceeded.

Flow agents for inorganic building material mixtures are today typical commodity products and, because of the cheaper competition by sulphonic acid group-containing naphthalene-formaldehyde condensation products or lignosulphonates, are under strong price pressure. A further improvement of the price/performance relationship of the melamine-formaldehyde-sulphite condensation products could be achieved by increasing the sulphonate group content since sulphite represents the cheapest component in the production. However, the desired increasing is limited because of the above-mentioned limiting molar relationships, especially of melamine to sulphite.

According to EP-A 0 006 135, it was also suggested to replace the relatively expensive melamine by cheaper urea in the mol ratios of melamine:urea of 0.75:0.25 to 0.35:0.7 but these resins display the disadvantage, that, under the strongly alkaline conditions in cement-containing masses, a cleavage of the condensation products takes place as far as the emission of ammonia from urea. Therefore, for environmental reasons and for the protection of the user, such products are today no longer acceptable.

On the other hand, a further increase of the number of sulphonic acid groups in the condensation product would be regarded as being toxicologically safe but hitherto it has not been possible to realise this. Furthermore, the sulphonic acid group-containing melamine-formaldehyde condensation products according to the prior art have a relatively high content of formate. According to the German guidelines for the granting of permission for concrete additives (wording of June, 1993, Section 6, point 2), certain chemical components of concrete additives are limited. In particular, concrete additives may not contain any materials in such amounts that the concrete or the corrosion protection of the reinforcement (concrete or prestressing steel) could be impaired. In this connection, chlorides, thiocyanates, nitrites, nitrates and formates are set out.

OBJECT AND SUMMARY OF THE INVENTION

Therefore, it is an object of the present invention to make available condensation products based on amino-s-triazines with at least two amino groups and form-aldehyde with a relatively high content of sulphonic acid groups and a small content of formate which can be produced with simple technical means and are justifiable not only from the economic but also from the ecological point of view.

According to the present invention, this object is achieved by making available condensation products based on amino-s-triazines with at least two amino groups, formaldehyde and sulphite which are characterised in that the mol ratio of amino-s-triazine:formaldehyde:sulphite is 1:2.5 to 6.0:1.51 to 2.0. The content of formate is <0.3% by weight. According to the present invention, these condensation products can be produced by a) heating amino-s-triazine, formaldehyde and a sulphite in a mol ratio of 1:2.5 to 6.0:1.51 to 2.0 in aqueous solution at a temperature of from 60 to 90° C. and at a pH value of from 9.0 to 13.0 until the sulphite is no longer detectable, b) thereafter, at a pH value of from 3.0 to 6.5 and at a temperature of 60 to 80° C., the condensation is continued until the condensation product has a viscosity of 5 to 50 mm$^2$/s at 80° C. and c) subsequently, the condensation product is adjusted to a pH value of 7.5 to 12.0 or a thermal after-treatment is carried out at a pH value of >10 and at a temperature of 60 to 100° C.

The mol ratio of amino-s-triazine:formaldehyde is preferably 1:2.5 to 4.0. The preferred range of amino-s-triazine:sulphite is 1:1.51 to 1.80. Furthermore, a mol ratio of formaldehyde:sulphite of 1.8 to 2.4:1 is preferred.

DETAILED DESCRIPTION OF PREFERRED EMBODIMENTS

Surprisingly, has, namely, been shown that, in this way, condensation products can be produced with outstanding liquefying action and high solids content which have an excellent storage stability.

The fact that the condensation products according to the present invention have a relatively low content of formate, which arises during the alkaline condensation reaction from formaldehyde by a Cannizzaro reaction, must also be regarded as being a further surprising effect.

In the first reaction step a), amino-s-triazine, formaldehyde and a sulphite are pre-condensed in aqueous solution at a temperature of from 60 to 90° C. and at a pH value of 9.0 to 13.0 until the sulphite is no longer detectable. The adjustment of the pH value is carried out with the usual alkaline-reacting compounds and preferably with an aqueous solution of sodium hydroxide.

Melamine is preferably used as amino-s-triazine but guanamines, for example benzo- or acetoguanamine, can also be used.

In the scope of the present invention, it is also possible to use a mixture of amino-s-triazine with other aminoplast formers, in which case up to 50 mol % of the mixture can consist of other amino-plast formers, for example urea, thiourea, dicyan-diamide or guanidine (salts). In the case that a part of the amino-s-triazine has been replaced by other aminoplast formers, this constitutes a part of the mol ratio.

Formaldehyde is preferably used in the form of a 30% aqueous solution (formalin). However, any other form can also be used, for example paraformaldehyde.

As sulphite derivatives, there are preferably used bisulphites or pyrosulphites. However, the corresponding alkali metal and alkaline earth metal sulphites can also be used.

The mol ratio of amino-s-triazine, formaldehyde and alkali metal sulphite in an amount of 1:3.0 to 6.0:1.51 to 2.0 is important for the present invention. Only in this way is it possible to produce condensation products with a relatively high content of sulphonic acid groups and a low content of formate. The mol ratio of amino-s-triazine to formaldehyde to sulphite is preferably 1:3.0 to 4.0:1.51 to 1.80 and the ratio of formaldehyde:sulphite is from 1.8 to 2.4:1. Since, in the scope of the process according to the present invention, the starting materials used are incorporated practically completely into the condensation products obtained, the molar composition thereof corresponds to the mol ratio of the starting materials. According to a preferred embodiment, the concentration of the starting components is so adjusted that the solids content of the end product is 30 to 60% by weight and preferably 40 to 50% by weight.

Subsequent to the alkaline pre-condensation (reaction step a)), in reaction step b), further condensation is carried out in an acidic pH range, namely, at a pH value of from 3.0 to 6.5 and at a temperature of 60 to 80° C. The adjustment of the pH value hereby takes place with the conventional acid-reacting compounds or salts and especially with mineral acids. For reasons of cost, sulphuric acid is hereby especially preferred.

The acidic condensation reaction is ended when the viscosity of the aqueous solution at 80° C. has reached values of from 5 to 50 mm$^2$/s and preferably of 5 to 25 mm$^2$/s. The measurement of the viscosity hereby takes place with conventional viscosity measurement apparatus, for example an Ubbelohde viscosimeter. To stop the acidic polycondensation reaction, according to reaction step c) a pH value of 7.5 to 12.0 is adjusted which, again, can take place with conventional alkaline-reacting compounds and preferably with an aqueous solution of sodium hydroxide.

In the scope of the present invention, it is also possible, instead of the pH value adjustment, to carry out a thermal post-treatment of the condensation products in an alkaline range at a pH value of ≧10 and at a temperature of 60 to 100° C. By means of this post-treatment step, the content of free formaldehyde, which is normally from about 0.2 to 0.3% by weight, can be still further reduced and, depending upon the period of time of the treatment (as a rule, 0.5 to 3 hours), can be adjusted to <0.2% by weight and especially of <0.1 by weight, whereby, however, the formate content can increase slightly.

The condensation products produced in this way have a relatively low content of formate of <0.3% by weight and even in the case of a high solids concentration are storage-stable, i.e. they can be stored for at least a year at ambient temperature without problems. Because of their good liquefying action, the condensation products according to the present invention are outstandingly useful as additives for inorganic binding agent suspensions and especially for those based on cement, lime and gypsum, in which case they can be used in an amount of 0.1 to 10% by weight and preferably of 0.1 to 5% by weight, referred to the binding agent content of the corresponding hydraulitically hardened building material mixtures (for example mortar, concrete or gypsum).

DETAILED DESCRIPTION OF PREFERRED EMBODIMENTS

The following Examples are giving for the purpose of illustrating the present inventions.

EXAMPLES

General Procedure for Production Examples 1 to 5

In a 2 liter three-necked flask equipped with stirrer, reflux condenser and dropping funnel are placed formaldehyde, as well as water, and rendered alkaline with aqueous sodium hydroxide solution I. Subsequently, melamine is introduced portionwise and thereafter aqueous sodium hydroxde solution II added thereto. In the case of a partial substitution of the melamine by other aminoplast formers, these are introduced after the melamine.

Subsequently, the sulphite is also introduced portionwise into the reaction solution and this is then heated to 70 to 80° C. As soon as the sulphite is no longer detectable, the solution is acidified by the addition of sulphuric acid. Condensation is carried out at 80° C. until the viscosity given in the following Table 2 is achieved. Subsequently, pH values of from 7.5 to 12.0 are adjusted with aqueous sodium hydroxide solution III (Examples 1 to 4). According to Example 5, after conclusion of the condensation reaction, there is also carried out a thermal post-treatment at 80° C. and at a pH value of >10.0 by the addition of aqueous sodium hydroxide solution III (period of time in minutes), the free formaldehyde content thereby being reduced to about 0.13% by weight.

TABLE 1

| | Mol ratios | | |
|---|---|---|---|
| Example | melamine | formaldehyde | sodium hydrogen sulphite |
| 1 | 1 | 3.33 | 1.53 |
| 2 | 1 | 3.60 | 1.70 |
| 3 | 1 | 3.70 | 1.90 |
| 4 | 1 | 3.80 | 2.00 |
| 5 | 1 | 3.33 | 1.53 |
| 6 (comparison Example) | 1 | 3.00 | 1.00 |

TABLE 2

Weighed-in amounts

| weighed-in amounts (g) | 1 | 2 | 3 | 4 | 5 | 6 (comparative example) |
|---|---|---|---|---|---|---|
| formalin, 30% | 333.0 | 360.0 | 370.0 | 380.0 | 333.0 | 300.0 |
| water | 55.0 | 45.0 | 60.0 | 70.0 | 55.0 | 156.0 |
| aq. sodium hydroxide soln. I, 20% | 0.5 | 0.5 | 0.5 | 0.5 | 0.5 | 0.5 |
| melamine | 126.0 | 126.0 | 126.0 | 126.0 | 126.0 | 126.0 |
| aq. sodium hydroxide soln. II, 20% | 16.8 | 16.8 | 16.8 | 16.8 | 16.8 | 16.8 |
| sodium disulphite | 145.35 | 161.5 | 180.5 | 190.0 | 145.35 | 95.0 |
| sulphuric acid, 10% | 100.0 | 130.0 | 130.0 | 130.0 | 100.0 | 50.0 |
| aq. sodium hydroxide soln. III 20% | 27.1 | 35.0 | 36.2 | 33.7 | 31.5 | |
| starting solid material (% by wt.) | 48.6 | 47.8 | 48.0 | 47.9 | 48.4 | 42.5 |
| end viscosity ($mm^2/s$) | 18.9 | 13.5 | 9.0 | 7.7 | 19.0 | 9.0 |
| solids content of final soln. (% by wt.) | 45.9 | 45.9 | 45.1 | 45.1 | 45.7 | 39.8 |

Testing

The verification of the liquefying properties of the condensates according to the present invention was carried out with reference to German Industrial Standard DIN 1048 in concrete mixtures. For this purpose, the following concrete mixtures were produced:

14.2 kg sand 0 to 4 mm
2.3 kg sand 4 to 8 mm
7.0 kg pebbles 8 to 16 mm
9.5 kg pebbles 16 to 32 mm
5.3 kg Portland cement 35 F
and the extent of spreading out determined 10 and 40 minutes after commencement of mixing.

Subsequent to the measurement of the extent of spreading out, test bodies were produced of 15×15×15 cm edge length and the compressive strength determined after 24 hours, as well as the bulk density. The results obtained are summarised in the following Table 3:

TABLE 3

Concrete: extent of spreading out

| additive according to Example | dosage (% by wt.) referred to cement | W/C | flow table spread (cm) $^a$10 | flow table spread (cm) $^a$40 | 1d compressive strength [$N/mm^2$] | bulk density [kg/$dm^3$] |
|---|---|---|---|---|---|---|
| 1 | 0.46 | 0.51 | 55.2 | 46.0 | 12.5 | 2.49 |
| 2 | 0.46 | 0.51 | 52.0 | 42.5 | 13.6 | 2.48 |
| 3 | 0.46 | 0.51 | 47.5 | 39.5 | 13.5 | 2.47 |
| 4 | 0.46 | 0.51 | 48.0 | 40.4 | 13.2 | 2.48 |
| 5 | 0.46 | 0.51 | 53.0 | 42.5 | 12.7 | 2.49 |
| 6 (comparison example) | 0.46 | 0.51 | 52.2 | 42.5 | 13.5 | 2.47 |
| blank value | — | | 36.0 | — | — | — |

Cement Flow

For the carrying out of the extent of the cement flow, use was made of 300 g of cement and 150 g of water (W/C=0.5). The cement was sprinkled into the water within the course of 1 minute and left to stand for a further minute. After intensive manual mixing up for 2 minutes, the cement paste was subsequently poured into a Vicat ring standing on a dry, fat-free, flat glass plate (internal measurement: D=75 mm, d=65 mm, H=40 mm) up to the edge of said Vicat ring. Immediately after filling, the Vicat ring was raised 2 cm and held for about 5 seconds over the outflowing slurry. The diameter of the cement slurry was determined on two axes lying vertically to one another. The arithmetic average of these two measurement values is the extent of flow in cm.

TABLE 4

Cement paste: extent of flow

| additive according to Example | dosage (% by wt.) referred to the cement | extent of flow (cm) |
|---|---|---|
| 1 | 0.3 | 23.5 |
| 2 | 0.3 | 24.6 |
| 3 | 0.3 | 21.8 |
| 4 | 0.3 | 22.6 |
| 5 | 0.3 | 23.6 |
| 6 (comparison example) | 0.3 | 24.4 |
| blank value | — | 18.0 |

Formate Content

The formate content of the condensation products according to the present invention was determined in aqueous solution by means of ion chromatography.

Apparatus
 ion chromatograph with conductivity detector and suppressor, Dionex 2110
 preliminary column AG 3, Dionex
 separating collumn AS 3, Dionex
 application loop 50 μl
 membrane filter 0.45 μm, Sartorius
 Eluent
 0.0015 mol sodium hydrogen carbonate/l liter of water, distilled, degassed
Flowthrough Rate
 2.3 ml/min.
Carrying Out
 The determination of content took place by means of a calibration curve, produced by means of standard formate solutions. The sample solutions were, in each case, injected twice, the standard solutions thereby being applied before and after the sample series. For the determination of content, in each case the average values were used.

TABLE 5 formate content

| example | formate content (% by wt.) |
|---|---|
| 1 | 0.22 |
| 2 | 0.29 |
| 3 | 0.16 |
| 4 | 0.24 |
| 5 | 0.25 |
| 6 (comparison example) | 0.45 |

Other embodiments of the invention will be apparent to those skilled in the art, and are contemplated to be within the scope of the claims appended hereto.

What is claimed is:

1. Condensation product based on amino-s-triazines with at least two amino groups, formaldehyde and sulphite, wherein the mole ratio of amino-s-triazine to formaldehyde to sulphite is 1:2.5 to 6.0:1.51 to 2.0 and the mole ratio of formaldehyde:sulphite is 1.8 to 2.4:1 and the formate content is less than 0.3% by weight, wherein up to 50 mole % of the amino-s-triazine can be replaced by other aminoplast formers selected from the group urea, thiourea, dicyanodiamide or guanidine (salts).

2. Condensation product according to claim 1, wherein said amino-s-triazine is melamine.

3. Condensation product according to claim 1, wherein the mole ratio of amino-s-triazine:formaldehyde is 1:2.5 to 4.0.

4. Condensation product according to claim 1, wherein the mole ratio of amino-s-triazine sulphite is 1:1.51 to 1.8.

5. Condensation product according to claim 1, in the form of an aqueous solution having a solids content of from 30 to 60% by weight.

6. Condensation product according to claim 5, wherein the solids content is 40 to 50% by weight.

7. Condensation product according to claim 5, wherein it has a viscosity of 5 to 50 $mm^2/s$ at 80° C.

8. Process for the production of a condensation product comprising
    (a) heating amino-s-triazine, formaldehyde and a sulphite at a temperature of from 60 to 90° C. and at a pH value of 9.0 to 13.0 in a mole ratio of 1:2.5 to 6.0:1.51 to 2.0, the mole ratio of formaldehyde to sulphite being 1.8 to 2.4:1 in aqueous solution until the sulphite is no longer detectable;
    (b) thereafter condensing at a pH value of 3.0 to 6.5 and at a temperature of 60 to 80° C. until the condensation product has a viscosity of 5 to 50 $mm^2/s$ at 80° C.; and
    (c) adjusting said condensation product to a pH of 7.5 to 12.0.

9. Condensation product according to claim 2, wherein said amino-s-triazine is melamine.

10. Condensation product according to claim 2, wherein the mole ratio of melamine:sulphite is 1:1.51 to 1.8.

11. Condensation product according to claim 3, wherein the mole ratio of amino-s-triazine:sulphite is 1:1.51 to 1.8.

12. Condensation product according to claim 2, in the form of an aqueous solution having a solids content of from 30 to 60%.

13. Condensation product according to claim 3, in the form of an aqueous solution having a solids content of from 30 to 60%.

14. Condensation product according to claim 4, in the form of an aqueous solution having a solids content of from 30 to 60%.

15. Condensation product according to claim 6, wherein it has a viscosity of 5 to 50 $mm^2/s$ at 80° C.

16. Condensation product according to claim 5, wherein it has a viscosity of 5 to 50 $mm^2/s$ at 80° C.

17. The condensation product prepared by the process of claim 8.

18. Process for the production of a condensation product comprising
    (a) heating amino-s-triazine, formaldehyde and a sulphite at a temperature of from 60 to 90° C. and at a pH value of 9.0 to 13.0 in a mole ratio of 1:2.5 to 6.0:1.51 to 2.0, the mole ratio of formaldehyde to sulphite being 1.8 to 2.4:1 in aqueous solution until the sulphite is no longer detectable;
    (b) thereafter condensing at a pH value of 3.0 to 6.5 and at a temperature of 60 to 80° C. until the condensation product has a viscosity of 5 to 50 $mm^2/s$ at 80° C.; and
    (c) thermally post-treating the condensation product a pH of $\geq 10.0$ and a temperature of 60 to 100° C.

19. A condensation product prepared by the process comprising the steps of
    (a) heating amino-s-triazine, formaldehyde and a sulphite at a temperature of from 60 to 90° C. and at a pH value of 9.0 to 13.0 in a mole ratio of 1:2.5 to 6.0:1.51 to 2.0, the mole ratio of formaldehyde to sulphite being 1.8 to 2.4:1 in aqueous solution, until the sulphite is no longer detectable;
    (b) thereafter condensing at a pH value of 3.0 to 6.5 and at a temperature of 60 to 80° C. until the condensation product has a viscosity of 5 to 50 $mm^2/s$ at 80° C.; and
    (c) adjusting said condensation product to a pH of 7.5 to 12.0.

* * * * *